(12) United States Patent
Cao (10) Patent No.: US 12,044,534 B2
(45) Date of Patent: Jul. 23, 2024

(54) SPATIAL AGGREGATION OF AUTONOMOUS VEHICLE FEEDBACK

(71) Applicant: GM Cruise Holdings LLC, San Francisco, CA (US)

(72) Inventor: Yanni Cao, San Francisco, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 151 days.

(21) Appl. No.: 17/364,439

(22) Filed: Jun. 30, 2021

(65) Prior Publication Data

US 2023/0015884 A1 Jan. 19, 2023

(51) Int. Cl.
*G01C 21/32* (2006.01)
*G01C 21/34* (2006.01)
*G06Q 10/02* (2012.01)

(52) U.S. Cl.
CPC ......... *G01C 21/32* (2013.01); *G01C 21/3415* (2013.01); *G01C 21/343* (2013.01); *G01C 21/3484* (2013.01); *G06Q 10/025* (2013.01)

(58) Field of Classification Search
CPC .. G01C 21/32; G01C 21/3415; G01C 21/343; G01C 21/3484; G06Q 10/025
See application file for complete search history.

(56) References Cited

U.S. PATENT DOCUMENTS

| | | | |
|---|---|---|---|
| 11,496,707 B1 * | 11/2022 | Crego | G06V 20/56 |
| 2018/0056992 A1 * | 3/2018 | Sogen | G06F 16/29 |
| 2019/0278885 A1 * | 9/2019 | Patton | H04L 51/222 |
| 2020/0068347 A1 * | 2/2020 | Warren | H04W 4/021 |
| 2020/0208998 A1 * | 7/2020 | Xiang | G06F 16/29 |
| 2021/0004363 A1 * | 1/2021 | Bailly | G06T 17/05 |

* cited by examiner

*Primary Examiner* — Anne Marie Antonucci
*Assistant Examiner* — Wesam Almadhrhi (57) ABSTRACT

The disclosed technology provides solutions for enriching map data with event information. In some aspects, the disclosed technology includes a process that includes steps for receiving a map query associated with the map for a user, aggregating one or more events that are associated with a respective location on a map, and processing the one or more events to generate one or more event clusters based on the map query. In some aspects, the process can further include steps for providing at least one of the one or more event clusters to the user. Systems and machine-readable media are also provided.

19 Claims, 8 Drawing Sheets

SPATIAL AGGREGATION OF AUTONOMOUS VEHICLE FEEDBACK

BACKGROUND

1. Technical Field

The disclosed technology provides solutions for enriching map data with event information and in particular, for generating event clusters representing map features or other characteristics associated with specific map locations.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as identifying and interpreting road signs, interpreting pedestrian and driver hand signals, and performing other navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

The maintenance of highly accurate map information is particularly important for the successfully deployment of autonomous vehicles (AVs). Given the potentially large number of ground-truth state changes that can occur in a given geographic area, such as in a densely populated city, one challenge of performing map maintenance is the surfacing of the most relevant map changes for use in performing the map update. In some approaches, adding specific features to the map can improve AV performance. For example, by provisioning the map with features that are problematic for AV operations, the AV may better reason about those features, thereby improving its navigation and planning operations.

In some aspects, changes to map data can be informed based on text-based feedback or notes that relate to the map. In some approaches, the feedback/notes can be generated by an AV operator or technician, for example, that document when deviations occur from the AV's normal operation. By way of example, operator notes can indicate when a human-assisted take-over event occurs with respect to the AV's operation, as well as the details attendant just before the take-over was performed. By way of example, the operator notes can specify a pre-condition or "event" that resulted in the takeover, or that correlated with the takeover. In other approaches, the feedback/notes for various events may be generated by one or more third-party sources, such as by users of a social-networking service, that provide comments regarding location-based events or phenomena. By way of example, location-based events, such as those associated with live sporting events, or emergency situations, can be described by users of a social media service, and associated with specific map locations or regions using location metadata.

In some aspects, various sources of text-based feedback and/or notes can be used to generate event information (or 'events') that can be associated with the map. In some examples, the events can be associated with specific locations or regions using corresponding metadata, such as Geolocation Positioning System (GPS) coordinate information. Depending on the desired implementation, the events can include words, terms, and/or phrases that describe a map feature, an event type, and/or a topographic characteristic of a region corresponds with the event. Additionally, in some aspects, event clusters can be generated to help identify patterns in phenomena related to specific map areas or locations.

In some approaches, collections of events can be processed to generate event clusters based on measures of similarity between events, as determined from various forms of event metadata. By way of example, the proximity between events and/or the similarities between associated terms, such as note information, can be used to perform clustering to generate event clusters. As discussed in further detail below, event clusters can be used to identify salient map features or characteristics that can be used to facilitate AV performance improvements and/or map updates, for example, in response to a user search or query.

Figure 1A:
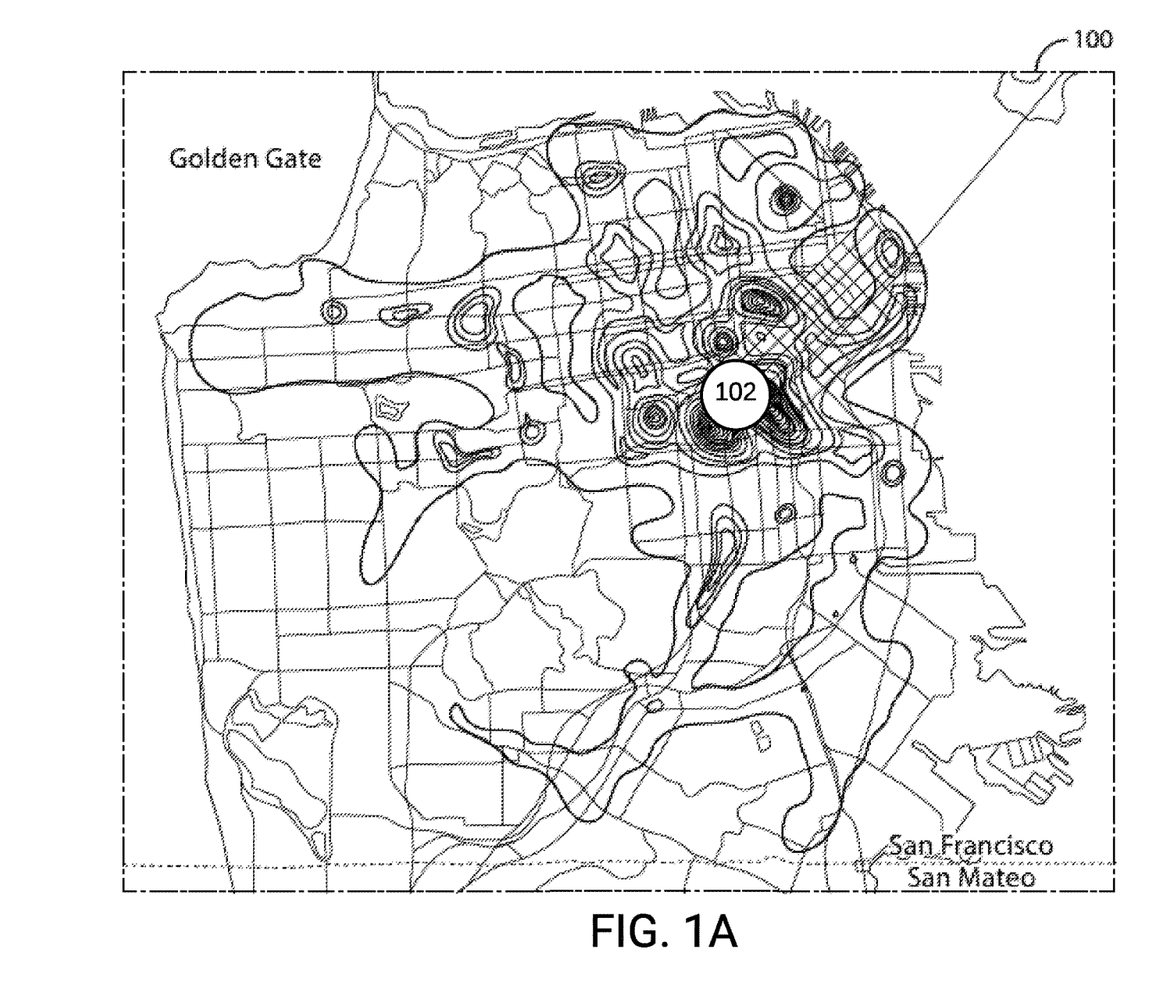
FIG. 1A illustrates an example heat map of autonomous vehicle (AV) events, according to some aspects of the disclosed technology.

FIG. 1A illustrates an example heat map of autonomous vehicle (AV) events, according to some aspects of the disclosed technology. In some aspects, the AV events can include AV takeover events that occur when a human-technician or operator takes control of the AV. Takeover events can be caused by AV malfunctions, or as a result of AV maneuvers that were deemed sub-optimal or unsafe by the occupying technician. Although vehicle takeover events can be due to unsafe or unpredictable AV operations, those of skill in the art will recognize that operator-initiated AV takeovers can result from normal AV operations, such as when the technicians take breaks, or for other reasons unrelated to AV operation. In some aspects, such as in instances of takeovers executed during the course of normal AV operation, the takeover event may be scored as a 'no-fault' takeover, or may be associated with other designations indicating that no AV malfunction occurred. As discussed in further detail below, inferences made from event information, or using event clusters, may be performed in a manner that filters out no-fault takeover events.

In the example of FIG. 1A, the recorded AV events are unevenly distributed, with a greater concentration of events located about map area 102. In some aspects, the AV events can represent various types of AV behaviors and/or malfunctions. By way of example, events can relate to specific types of AV error/s, or error patterns, such as to indicate a greater probability of AV failure when specific maneuvers were attempted (e.g., a left-turn) at a specific location (e.g., in an intersection). In other aspects, events can indicate the occurrence of AV operational anomalies that occur due to inaccurate (e.g., incorrect or outdated) map data. By way of example, the AV may encounter areas of the map that were incorrectly labeled, and/or areas that contain features that are not included in the map data. Depending on the desired implementation, AV event data, as represented in the heat-map example of FIG. 1A, may be specific to a particular time period, or pre-specified date range. By way of example, the heatmap representation of event data can indicate the location of all events within the past three months, or six months, etc.

Figure 1B:
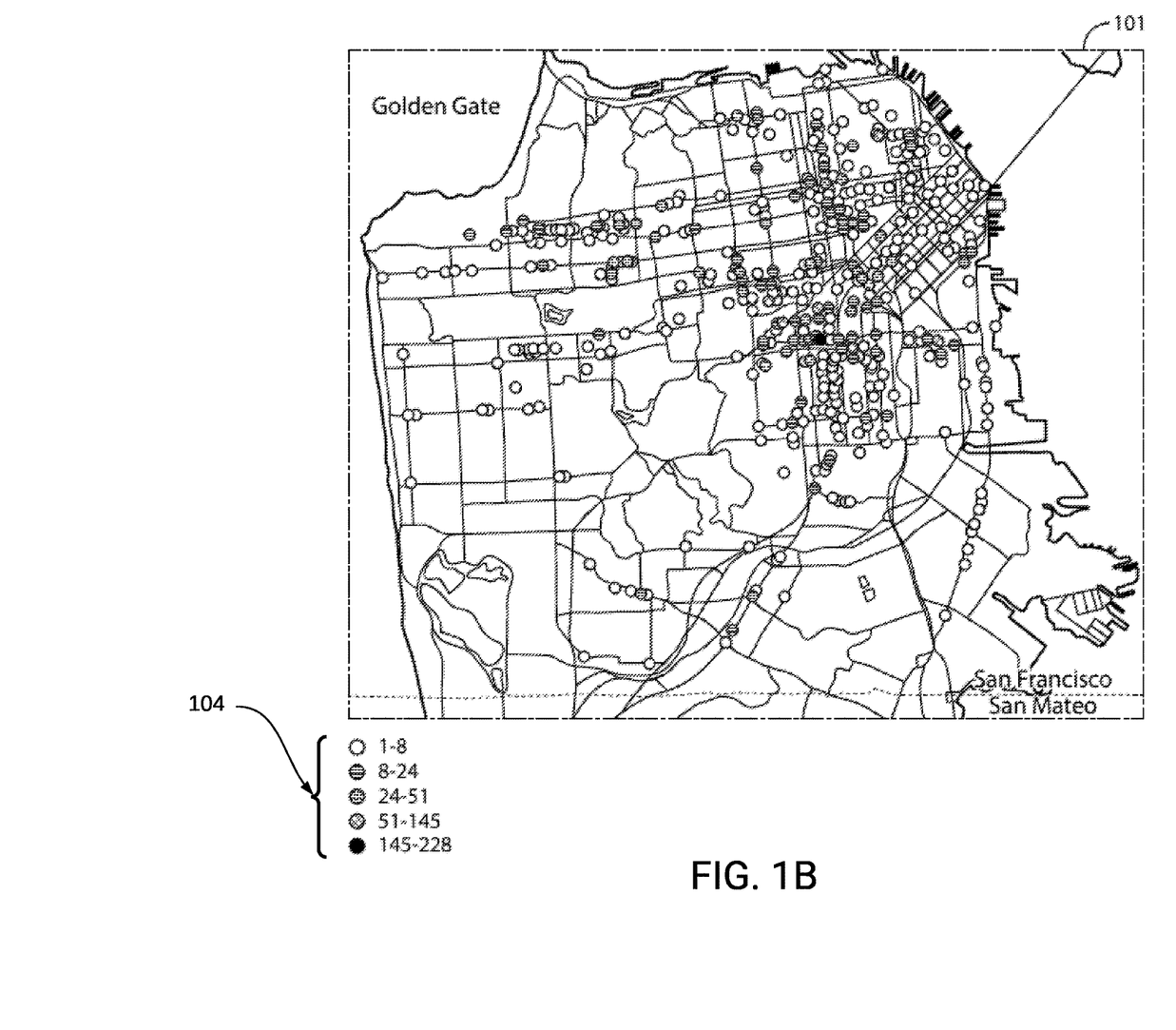
FIG. 1B illustrates an example of event clusters corresponding with the AV events illustrated in FIG. 1A, according to some aspects of the disclosed technology.

FIG. 1B illustrates an example of event clusters 101 corresponding with the AV events illustrated in FIG. 1A. As indicated by legend 104, the density of various events can vary in relation to map location or region. For example, map locations that include difficult terrain or other features challenging to AV operation may correspond with a greater number of events, for example, that are recorded in feedback or notes, associated with specific map locations.

Figure 1C:
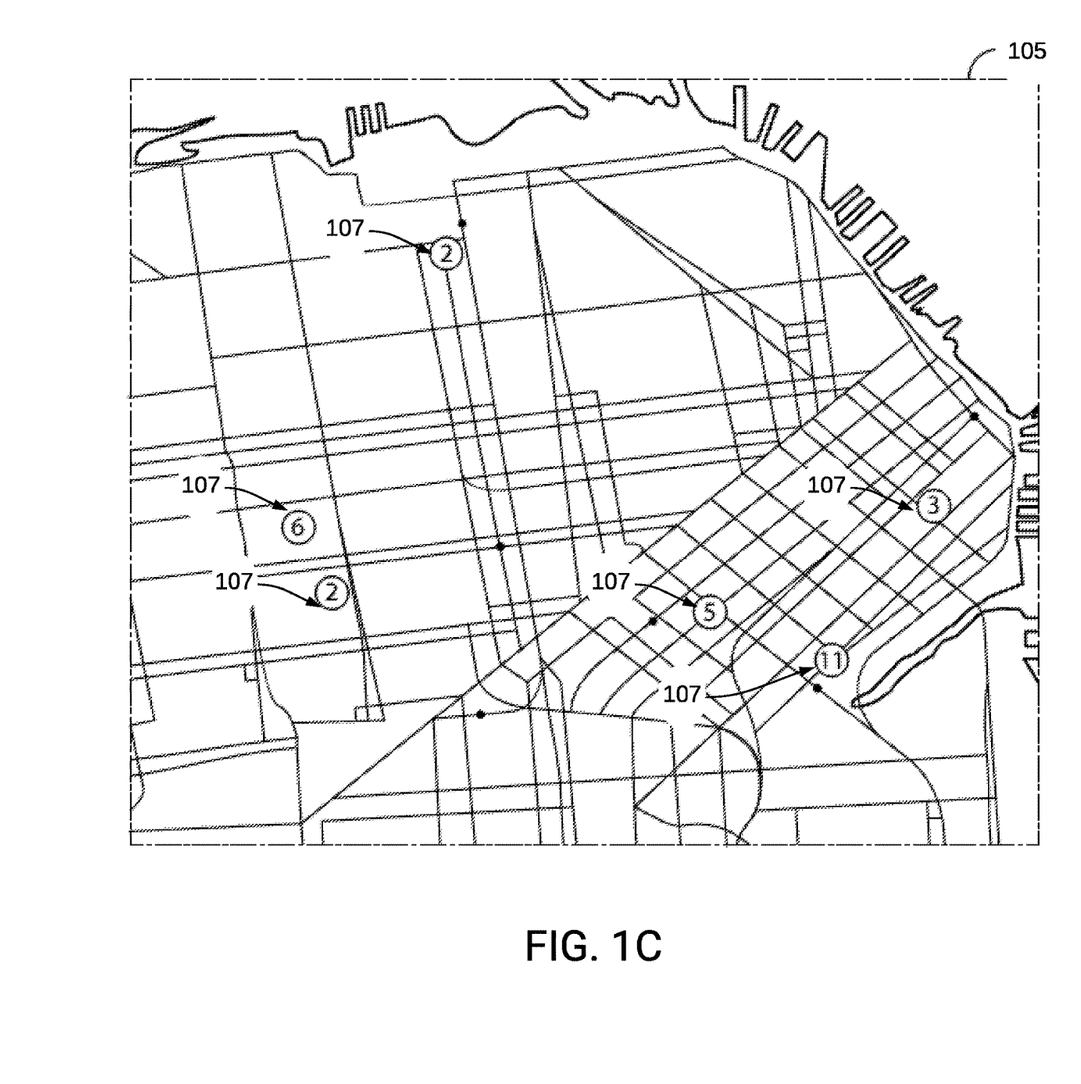
FIG. 1C illustrates an example of event clusters that can be returned to a user in response to a search term query or user query, according to some aspects of the disclosed technology.

FIG. 1C illustrates an example of a map 105 containing geospatial event clusters 107 that can be returned to a user in response to a search term or user query, according to some aspects of the disclosed technology. In the illustrated example of FIG. 1C, each of the event clusters 107 can represent a cluster that is provided to a user in response to a provided search term or query. In some approaches, user search terms can relate to map features, for example, that are either represented by the map, or that have not yet been added. By way of example, the search term may include one or more words or word combinations (phrases), such as 'bicycle,' 'bicycle station,' and/or 'bicycle rack.'

As discussed in further detail below, event clusters can be generated based on one or more cluster parameters, such as a physical proximity between events, e.g., as indicated by geolocation metadata, and/or similarities in note/term data. Depending on the desired implementation, note/feedback similarities can be determined based on similarities in semantic descriptions, such as those encoded by text-based, and/or audio-based feedback information. By way of example, the terms 'bike' and 'bicycle' may be determined to be highly similar based on their shared semantic meaning, whereas the terms motorbike and bicycle may be deemed to share less similarity.

Figure 2:
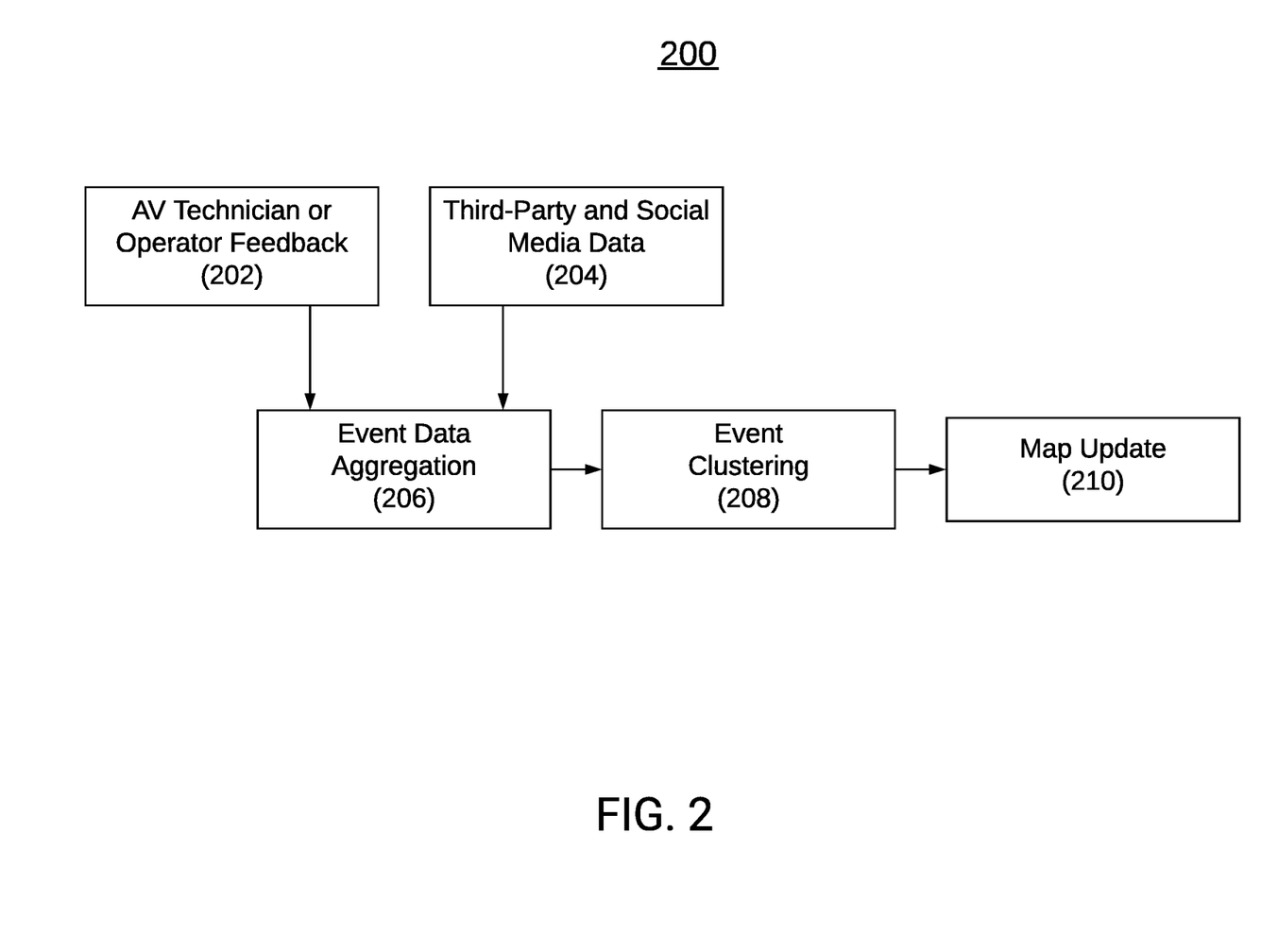
FIG. 2 illustrates a block diagram of an example system for associating event clusters with a map, according to some aspects of the disclosed technology.

FIG. 2 illustrates a block diagram of an example system for associating event clusters with a map, according to some aspects of the disclosed technology. System 200 includes components for collecting map feedback data (or map notes), such as through the collection of AV technician or operator feedback (block 202), and/or via third-party data, such as data received from one or more various social networking platforms.

In some aspects, AV technician feedback (block 202) can include field notes that are generated to document various AV operations, such as conditions under which AV maneuvering operations were overtaken by a human operator. By way of example, AV planning and navigation functions may perform sub-optimally when the AV encounters certain map features, or specific areas of the map that correspond with a given map feature, such as a bicycle stall. In such examples, the AV technician feedback/notes can include descriptions of the feature, such as, "bike", or "bicycle stall." The feedback can be associated with a timestamp and location information, for example, to indicate a time and/or location where the takeover (or another AV malfunction) occurred. As such, the feedback/notes can include time information, location information, as well as other types of semantic metadata that describes the AV's disposition, or characteristics of the AV's environment, at a particular time and place.

In some aspects, third-party data, such as social-media data, can provide feedback/notes regarding events occurring at one or more geographic regions, i.e., map areas (block 204). By way of example, third-party data can describe events that are occurring in a particular location, such as those relating to a social activity (e.g., a sporting event, or concert), or those relating to a natural disaster or emergency situation, e.g., a fire or flood, etc. Similar to the technician feedback/notes, third-party data can include various forms of semantic information (e.g., that can be extracted from text, images, audio data, etc.), as well as time and location information. By way of example, social media feeds can include location metadata (e.g., GPS coordinates, or other location information) as well as text-based descriptions, such as, social-media feeds. The AV feedback/notes and/or third-party/social media data (blocks 202, 204) can be aggregated into an event dataset (block 206). Subsequently, the aggregated event data can be clustered to generate event clusters (block 208).

In some aspects, clustering may be performed based on a physical distance metric, e.g., based on a distances between events as determined from corresponding location/position information. For example, event clusters may be generated using a density-based spatial clustering of applications with noise (DBSCAN) algorithm. As used herein, DBSCAN is a density-based clustering non-parametric algorithm that can be configured to group points in space that are closely packed together (points with many nearby neighbors). In some aspects, the DBSCAN algorithm can be configured to perform marking for outlier points that lie alone in low-density regions (whose nearest neighbors are too far away).

In some implementations, the DBSCAN process can be described as follows: Consider a set of points in some space to be clustered. Let ϵ be a parameter specifying the radius of a neighborhood with respect to some point. For the purpose of DBSCAN clustering, the points are classified as core points, (density-) reachable points and outliers. 1) A point p is a core point if at least minPts points are within distance E of it (including p). 2) A point q is directly reachable from p if point q is within distance E from core point p. Points are only said to be directly reachable from core points. 3) A point q is reachable from p if there is a path $p_1, \ldots, p_n$ with $p_1=p$ and $p_n=q$, where each $p_{i+1}$ is directly reachable from $p_i$. Note that this implies that the initial point and all points on the path must be core points, with the possible exception of q. 4) All points not reachable from any other point can be deemed to be outliers or noise points.

By way of example, DBSCAN can be implemented by first receiving AV technician or operator feedback notes/data that include geolocation and timestamp information. The operator feedback can then be processed to ensure that the geolocations are under the same map projection and timestamp format. Then, the DBSCAN algorithm can be applied on the dataset. In some approaches, the algorithm can be configured to randomly select a data point p, and if at least a predetermined number of points (i.e., minPts) are within distance E of the selected point (p), a cluster can be identified. That is, a cluster can be positively identified if a requisite number of points (specified by minPts), is determined to be within distance E of a selected core point. Depending on the desired implementation, minPts can be a configurable parameter. In some approaches, distance E can be defined as a distance combining latitude, longitude, and time. However, a greater (or fewer) number of dimensions may be used to compute distance E, without departing from the scope of the disclosed technology.

Further to the above example, an additional point, e.g., point q, can represent a different set of AV technician feedback note data in the same dataset. Using the DBSCAN clustering process, point q is directly reachable from p if point q is within distance E from core point p. Next, DBSCAN can find all the reachable points from p via other core points. To complete the clustering process, the foregoing steps can be iterated to find all clusters. In some approaches, any points that are not reachable from any other point are deemed to be outliers or noise points.

In other aspects, the information content of the events may be represented using higher-dimensional representations, e.g., whereby distances can be further based on the semantic meaning of the associated feedback, notes, and/or labels, etc. As understood by those of skill in the art, clustering may be performed using various other similarly measurements, depending on the desired implementation. Some examples of similarity measurements can include the Minkowski distance or the Mahalanobis distance. The Minkowski distance may be appropriate where feature vectors are independent and each feature vector is of equal importance. For example, if D is the distance between feature vectors v and w, and fi(x) is the number of features in a bin i of x, the Minkowski distance can be defined as:

$$D(v,w)=(\Sigma_i|f_i(v)-f_i(w)|^p)^{1/p}, \quad \text{(Equation 1)}$$

where p=1 is the L1 distance (also sometimes called the Manhattan distance), p=2 is the L2 distance (also known as the Euclidean distance), and p=∞ is the L∞ distance (also called the Chebyshev distance).

The Mahalanobis distance may be appropriate when each dimension of the feature vector is dependent of each other and is of different importance. The Mahalanobis distance can be defined as:

$$D(v,w)=\sqrt{(\mathcal{F}_v-\mathcal{F}_w)^T C^{-1}(\mathcal{F}_v-\mathcal{F}_w)} \quad \text{(Equation 2)}$$

where C is the covariance matrix of the feature vectors v and w, $\mathcal{F}$ v and $\mathcal{F}$ w are vectors that list all the feature values in fi(v) and fi(w). Other similarity (or distance) measures that can also be used include the cosine similarity, Jaccard coefficient, the Pearson correlation coefficient, and the averaged Kullback-Leibler divergence, among others.

Some examples of clustering include partitional clustering, hierarchical clustering, density-based clustering, and grid-based clustering, among others. Partitional clustering can divide data points into a predetermined number of partitions where each partition can represent a cluster. Clusters can be formed by optimizing a partitioning criterion, such as maximizing a similarity measure within a cluster and/or maximizing a distance measure between different clusters. Some examples of partitioning clustering include k-means clustering, k-medians clustering, k-medoids clustering, and other variations. K-means clustering can proceed by alternating steps, assignment and update. During assignment, each data point (e.g., matrix element) can be assigned to a cluster having the nearest mean to the data point. During update, the new means can be calculated to be the centroids of the data points in the new clusters. Convergence can be achieved when the assignments no longer change. K-medians can compute the nearest median to represent each cluster during assignment and update. K-medoids can use real data points (referred to as medoids) as the cluster centers. Other variations of partitional clustering methods can utilize different initialization criteria (e.g., how the initial centroids are selected), assignment functions, update functions, and similarity or distance measures, among others. Depending on the desired implementation, clustering may be performed using either an unsupervised process, or a supervised process, without departing from the scope of the disclosed technology.

Once clustering has been performed to generate the event clusters, a map can be updated, so that the map data is enriched with the event cluster information (block 210).

In some aspects, the updated/enriched map data can be used to surface insights that are relevant to AV operations. By way of example, a user may provide a search query such as "bike" or "bike rack" to determine if any event clusters relate to those terms. In instances where event clusters are representative of potential malfunctions, such search queries can be used to identify specific types of map features that are problematic for AV operations, such as maneuvering and/or navigation functions.

In some examples, the returned event clusters may relate to features that are missing from the map data, or that is inaccurately represented. In such cases, the event clusters can be used to inform map updates.

In other examples, the returned event clusters may indicate features that are problematic to AV operations, such as objects or driving scenarios that are problematic for AV maneuvering and/or routing operations. In such cases, the event clusters can be used to inform updates to various software modules of the AV, e.g., to improve AV performance. More detailed examples of the ways in which event data can be used to facilitate AV performance improvements and/or map updates is discussed with respect to FIG. 3A, below.

Figure 3A:
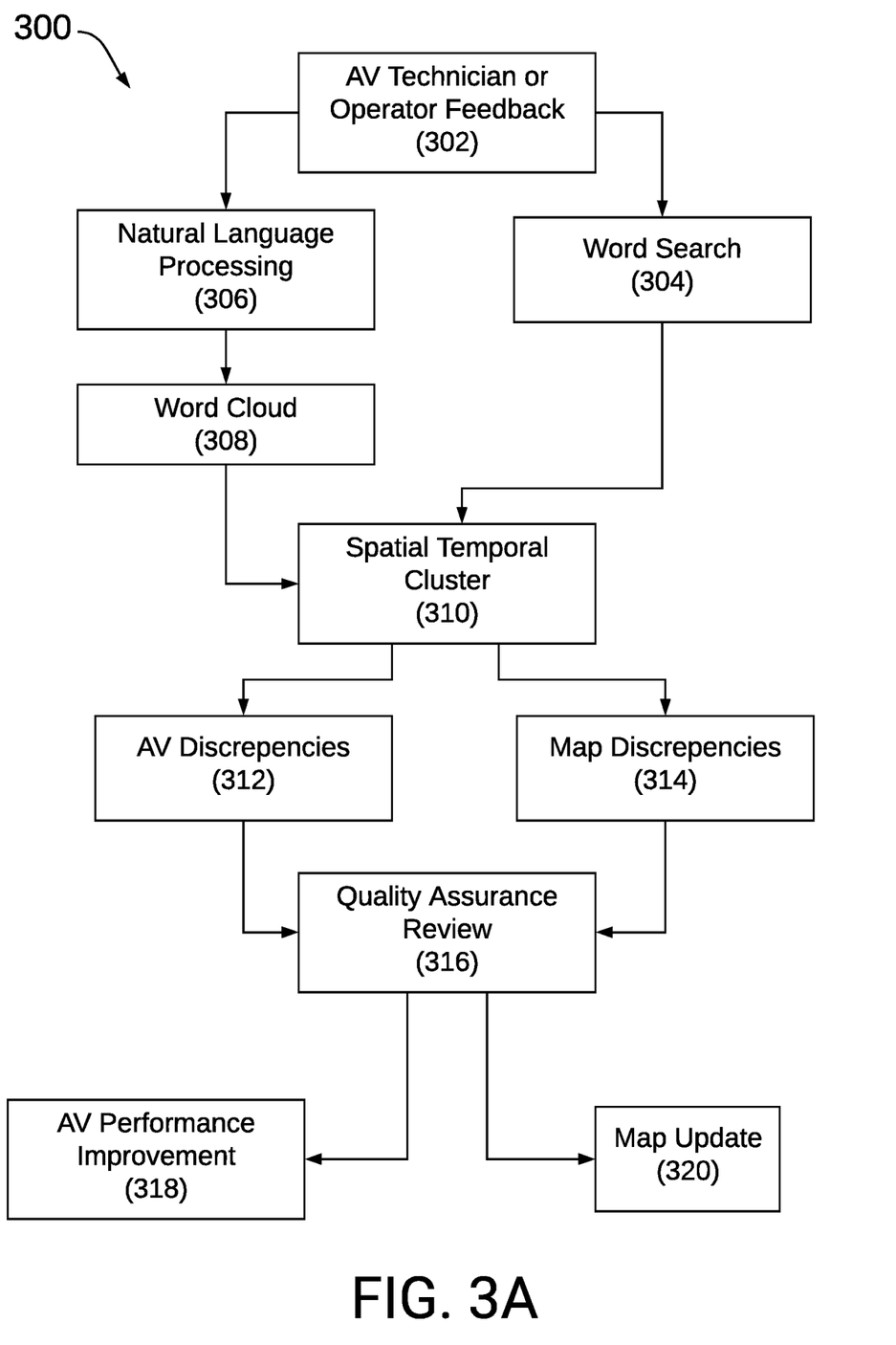
FIG. 3A illustrates an example workflow for a process for using AV technician feedback/notes to make AV performance improvements and/or perform map updates, according to some aspects of the disclosed technology.

Specifically, FIG. 3A illustrates an example workflow for a process 300 of using AV technician (or operator) feedback (notes) to make AV performance improvements and/or perform map updates. Process 300 begins with step 302 in which AV technician or operator feedback/notes are generated, e.g., by the operator of an AV. In some aspects, the technician's notes can describe various details relating to one or more takeover events with respect to the AV, i.e., when the technician takes control of one or more AV functions, such as routing and/or navigation operations. In some aspects, takeover events can correspond with a malfunction of the AV, for example, that is due to AV limitations in performing certain driving maneuvers, or in responding in a timely manner to changes in the driving context. In some instances, AV takeover events can be due to detected inaccuracies in map data that is used by the AV. For example, the technician/operator may need to take control of the AV if a map feature (such as a bike station) is encountered, and that is unrepresented of the AV's map. The map discrepancies could be caused by real world changes or labeling errors.

Depending on the desired implementation, AV technician feedback/notes can include text information that includes terms or phrases describing the circumstances of a takeover. However, technician feedback can include other data types (such as audio data describing an event) without departing from the scope of the disclosed technology.

Process 300 can include the processing of the AV/technician notes in order to identify similarities between terms and/or descriptions. In some approaches, similarities between notes can be identified using a natural language processing (block 306) technique. For example, natural language processing can be used to generate various indicators of word/phrase similarity, such as word cloud (308) representations of AV technician note terms. In some aspects, similar terms, for example that are returned as a word cloud, can then be further clustered based on other factors, such as spatial/temporal relationships (block 310). By way of example, terms that are associated with geolocation information that share a close spatial proximity may be more likely to be clustered or grouped, as opposed to the grouping of disparate terms, or those that do not share a close spatial relationship.

Alternatively, in some approaches, the AV operator/technician notes may be filtered and/or clustered based on a search term provided by a user (block 304). By way of example, a user, such as an operator or technician, may wish to better understand how a particular feature has impacted AV operations. For example, if the technician wants to better understand how bike rack features have impacted AV operations, the terms 'bike,' or 'bicycle stall' may be provided as a search term. In such instances, spatial-temporal clustering (310) can be performed for events that relate to the search term, e.g., 'bike', or 'bicycle stall.'

Depending on the desired implementation, spatial-temporal clusters (310) can be used to either identify AV discrepancies (block 312), or to identify map discrepancies (block 314). By way of example, AV discrepancies may be identified where there are patterns in AV malfunctions, for example, that are highly correlated with particular behaviors and/or map contexts. By way of example, AV discrepancies may include indications that an AV has difficulty performing a particular maneuver (e.g., a left turn), in a specific area (e.g., in an intersection). Additionally, AV discrepancies may indicate patterns in degraded AV performance with respect to specific map feature encounters. For example, spatial-temporal clusters may surface patterns of AV takeover events when the AV approaches specific features, such as bike stalls.

In some instances, the spatial temporal clusters (310) can be used to identify map discrepancies. For example, AV takeover events may occur when the AV's map data fails to correspond with the (ground truth) features encountered during operations. In such cases, the clusters may be used to identify feature discrepancies, for example, that may result from recent topographic (ground truth) changes, resulting in outdated map data. In other instances, map discrepancies may be due to labeling errors, or other errors in preparing the AV's map data. The various types of AV discrepancies (block 312) and/or map discrepancies (block 314) can be diagnosed in a quality assurance review process (block 316).

In some aspects, the results of the QA review (block 316) can be used to identify and facilitate AV performance improvements (block 318), for example, in the form of software updates, AV repairs, and/or sensor calibration. Additionally, the results of the QA review (block 316) can be used to help perform map updates (block 320), to either add missing map features, remove incorrect map features, or to make other edits to map data to increase a total correspondence with ground truth data that is collected by one or more AV sensors.

Figure 3B:
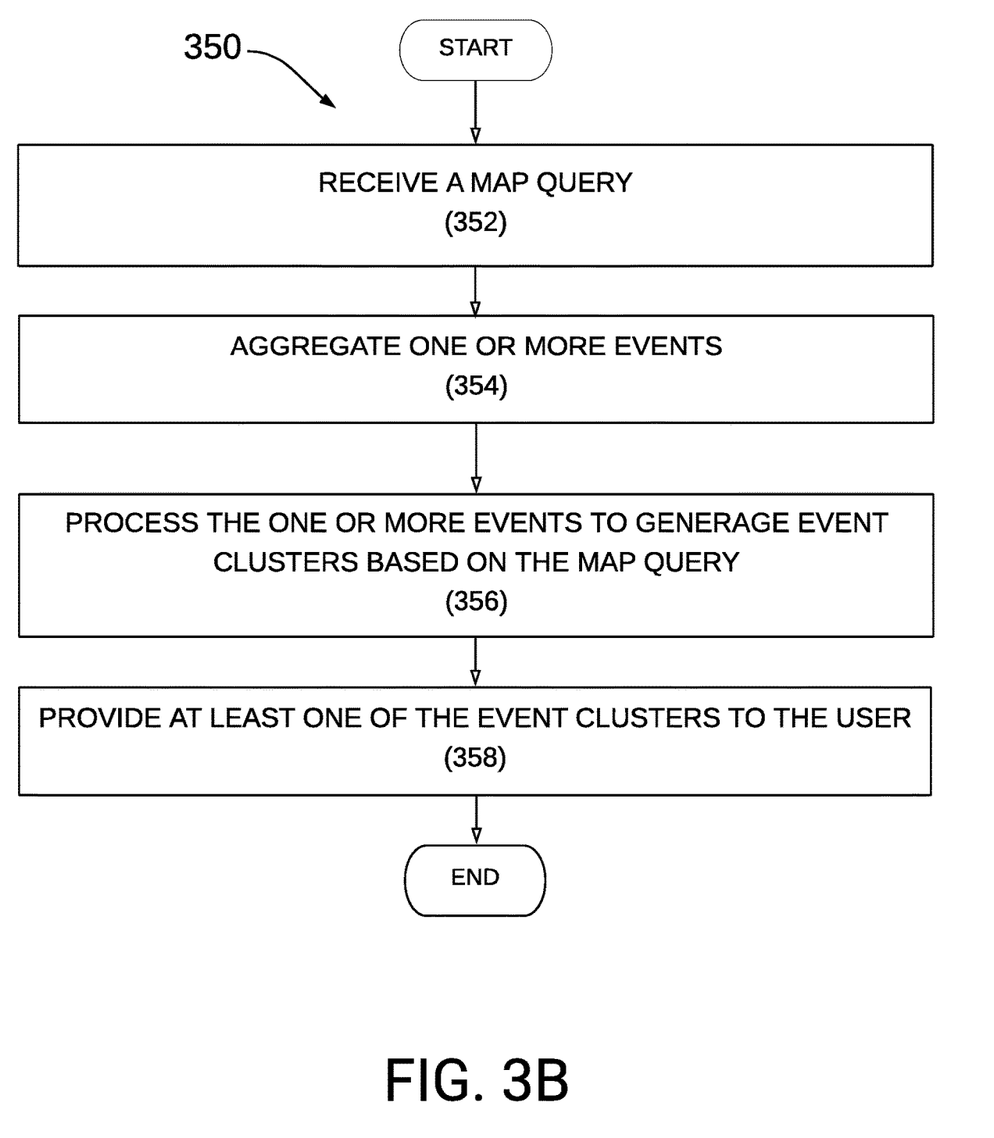
FIG. 3B illustrates a block diagram of a process for identifying map characteristics based on a map query, according to some aspects of the disclosed technology.

FIG. 3B illustrates a block diagram of a process 350 for identifying map characteristics based on a map query. At step 352, process 350 includes receiving a map query associated with the map. By way of example, the map query may describe a characteristic or feature relating to the map e.g., "bike" or "bike rack." In some instances, the map query may include one or more terms relating to map features that have not been included in the map data. At step 354, aggregating one or more events (e.g., event data), wherein each of the events is associated with a respective location on a map. As discussed above, event data can originate from technician or operator feedback or notes. In other approaches, event data can be derived from other sources, such as from social media feeds.

Further to the examples illustrated with respect to FIGS. 1B and 1C, events (or event data) can describe specific characteristics or phenomena pertaining to the operation of one or more AVs, and/or pertaining to various ground-truth map characteristics. As such, the events (or event data) can be used to represent different characteristics or location-based phenomena. As described above, event data can be used to describe a vehicle takeover event for an autonomous vehicle, e.g., that occurs when an operator takes control of the vehicle due to safety concerns or as a result of AV malfunctions. In some aspects, event data can include data or descriptors that relate to one or more pre-existing map features, such as intersections, road signs, traffic lights, or the like. In other examples, event data can be associated with objects or features that are not represented on the map or by current map data. At step 356, process 350 includes processing the plurality of events to generate one or more event clusters. Further to the example discussed above, user (e.g., operator or technician) generated map queries can be used to cluster or filter various events, for example, based on term similarity. Further to the example discussed with respect to FIG. 3B, a search term/query (received at step 354) containing the terms "bike", "bicycle," and/or "bicycle rack," can be used to group events, for example, using event metadata. That is, clustering can be performed using a search term/query received from the user. In other aspects, clustering may be performed using other data, such as event metadata indicating geolocation information for each aggregated event.

At step 358, process 350 includes providing at least one of the event clusters to the user. As discussed above, returned event clusters can be used in quality review processes, for example, to facilitate AV performance improvements and/or map updates.

Figure 4:
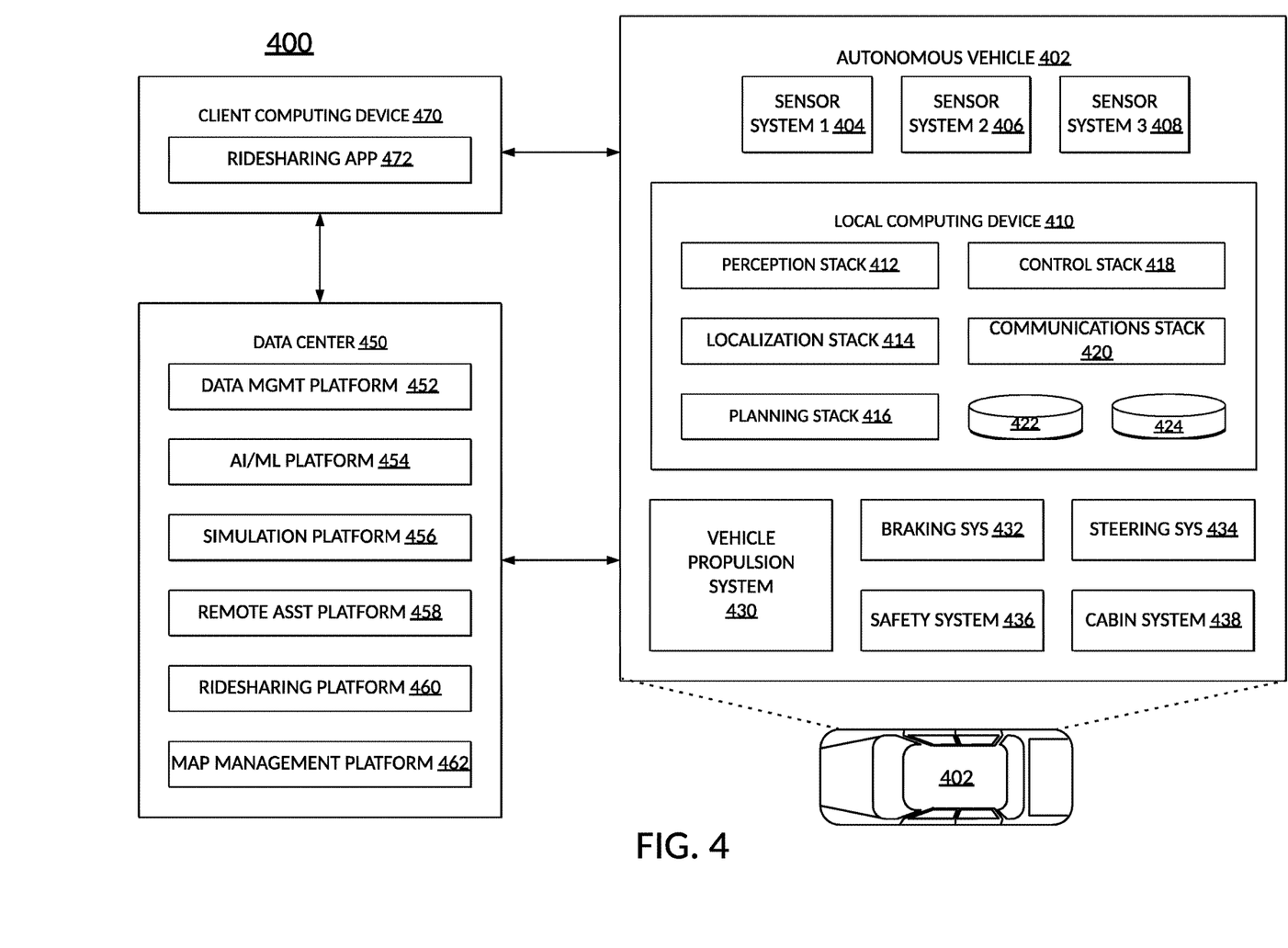
FIG. 4 illustrates an example system environment that can be used to facilitate AV dispatch and operations, according to some aspects of the disclosed technology.

Turning now to FIG. 4 illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, brake pads, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an HD geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data as discussed further below with respect to FIG. 2 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, a ridesharing platform 460, and map management system platform 462, among other systems.

Data management platform 452 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management system platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management system platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management system platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management system platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, UAVs, satellites, third-party mapping services, and other sources of geospatially referenced data. The raw data can be processed, and map management system platform 462 can render base representations (e.g., tiles (2D), bounding volumes (3D), etc.) of the AV geospatial data to enable users to view, query, label, edit, and otherwise interact with the data. Map management system platform 462 can manage workflows and tasks for operating on the AV geospatial data. Map management system platform 462 can control access to the AV geospatial data, including granting or limiting access to the AV geospatial data based on user-based, role-based, group-based, task-based, and other attribute-based access control mechanisms. Map management system platform 462 can provide version control for the AV geospatial data, such as to track specific changes that (human or machine) map editors have made to the data and to revert changes when necessary. Map management system platform 462 can administer release management of the AV geospatial data, including distributing suitable iterations of the data to different users, computing devices, AVs, and other consumers of HD maps. Map management system platform 462 can provide analytics regarding the AV geospatial data and related data, such as to generate insights relating to the throughput and quality of mapping tasks.

In some embodiments, the map viewing services of map management system platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
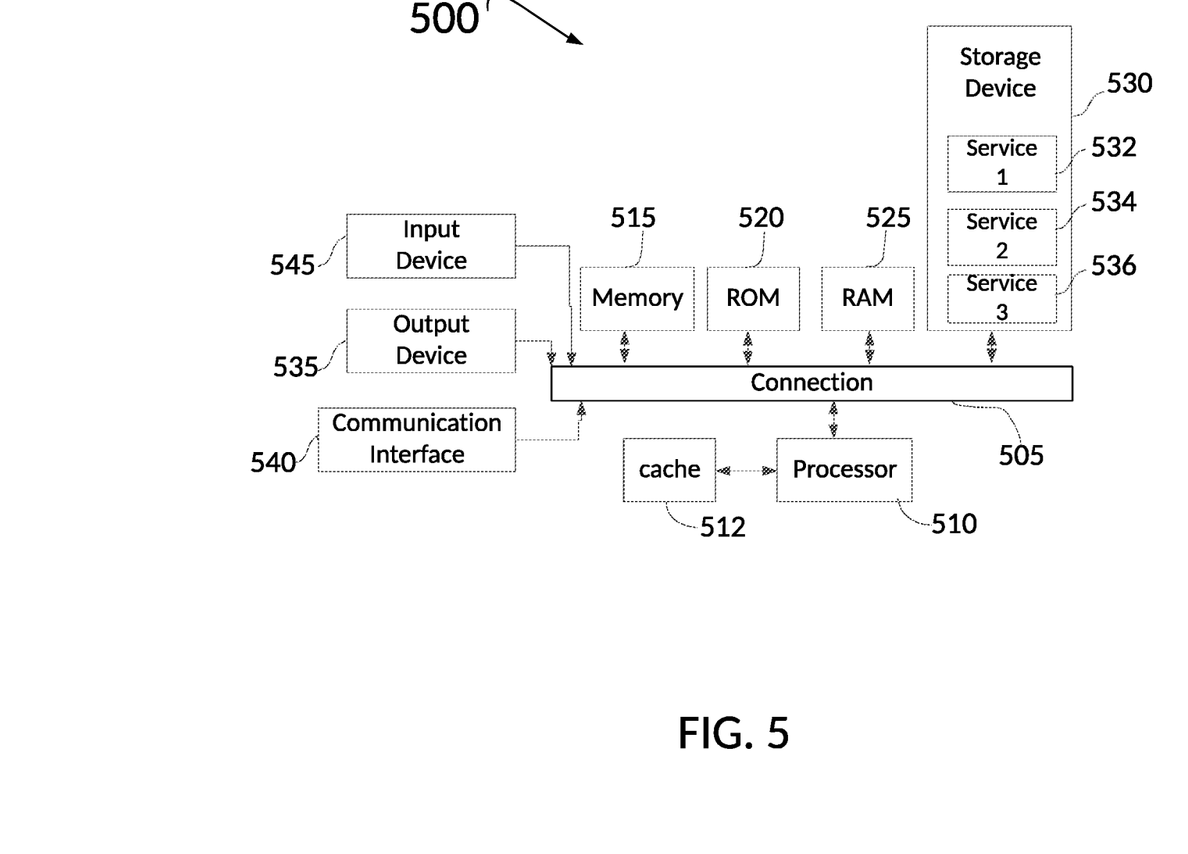
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up internal computing system 510, remote computing system 550, a passenger device executing the rideshare app 570, internal computing device 530, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system comprising:
   one or more processors; and
   a computer-readable medium coupled to the one or more processors, wherein the computer-readable medium comprises instructions that are configured to cause the one or more processors to perform operations comprising:
   receive, by an autonomous vehicle (AV) fleet management server, user feedback corresponding to a plurality of AV takeover events that are associated with a fleet of AVs that is managed by the AV fleet management server;
   determine a semantic meaning of the user feedback for each of the plurality of AV takeover events;
   process the user feedback to generate a plurality of feature vectors corresponding to the plurality of AV takeover events, wherein each of the plurality of feature vectors include a spatial parameter associated with the user feedback, a temporal parameter associated with the user feedback, and the semantic meaning of the user feedback;
   generate one or more event clusters that include at least a portion of the plurality of AV takeover events, wherein the one or more event clusters are generated based on a similarity measurement among at least a portion of the plurality of feature vectors;
   identify, based on the one or more event clusters, at least one of an AV discrepancy and a map discrepancy that is associated with the portion of the plurality of AV takeover events; and
   direct the fleet of AVs to navigate a real-world environment based on at least one of the AV discrepancy and the map discrepancy.

2. The system of claim 1, wherein to process the user feedback to generate the one or more event clusters the one or more processors are further configured to perform operations comprising:
   identify, based on the user feedback, at least two AV takeover events from the plurality of AV takeover events that have similar label data; and
   identify, based on the user feedback, at least two AV takeover events from the plurality of AV takeover events that have similar location coordinate data.

3. The system of claim 1, wherein the map discrepancy corresponds to a mislabeled pre-existing map feature.

4. The system of claim 1, wherein the map discrepancy corresponds to a feature that is not represented on an AV map.

5. The system of claim 1, wherein the user feedback is received via a social-networking platform.

6. The system of claim 1, wherein the user feedback comprises label data, location coordinate data, or a combination thereof.

7. The system of claim 1, wherein the AV discrepancy is associated with at least one of an AV maneuver, a map feature, and a map location.

8. The system of claim 7, wherein the one or more processors are further configured to perform operations comprising:
   initiate an AV performance improvement for one or more AVs in the fleet of AVs, wherein the AV performance improvement includes at least one of an AV software update, an AV repair, an AV sensor calibration, an AV map update, and an AV map correction.

9. A computer-implemented method, comprising:
   receiving, by an autonomous vehicle (AV) fleet management server, user feedback corresponding to a plurality of AV takeover events that are associated with a fleet of AVs that is managed by the AV fleet management server;
   determining a semantic meaning of the user feedback for each of the plurality of AV takeover events;
   processing the user feedback to generate a plurality of feature vectors corresponding to the plurality of AV takeover events, wherein each of the plurality of feature vectors include a spatial parameter associated with the user feedback, a temporal parameter associated with the user feedback, and the semantic meaning of the user feedback;
   generating one or more event clusters that include at least a portion of the plurality of AV takeover events, wherein the one or more event clusters are generated based on a similarity measurement among at least a portion of the plurality of feature vectors;
   identifying, based on the one or more event clusters, at least one of an AV discrepancy and a map discrepancy that is associated with the portion of the plurality of AV takeover events; and directing the fleet of AVs to navigate a real-world environment based on at least one of the AV discrepancy and the map discrepancy.

10. The computer-implemented method of claim 9, wherein processing the user feedback to generate the one or more event clusters further comprises:
identifying, based on the user feedback, at least two AV takeover events from the plurality of AV takeover events that have similar label data; and
identifying, based on the user feedback, at least two AV takeover events from the plurality of AV takeover events that have similar location coordinate data.

11. The computer-implemented method of claim 9, wherein the map discrepancy corresponds to a mislabeled pre-existing map feature.

12. The computer-implemented method of claim 9, wherein the map discrepancy corresponds to a feature that is not represented on an AV map.

13. The computer-implemented method of claim 9, wherein the user feedback is received via a social-networking platform.

14. The computer-implemented method of claim 9, wherein the user feedback comprises label data, location coordinate data, or a combination thereof.

15. A non-transitory computer-readable storage medium comprising instructions stored therein, which when executed by one or more processors, cause the one or more processors to perform operations comprising:
receive, by an autonomous vehicle (AV) fleet management server, user feedback corresponding to a plurality of AV takeover events that are associated with a fleet of AVs that is managed by the AV fleet management server;
determine a semantic meaning of the user feedback for each of the plurality of AV takeover events;
process the user feedback to generate a plurality of feature vectors corresponding to the plurality of AV takeover events, wherein each of the plurality of feature vectors include a spatial parameter associated with the user feedback, a temporal parameter associated with the user feedback, and the semantic meaning of the user feedback;
generate one or more event clusters that include at least a portion of the plurality of AV takeover events, wherein the one or more event clusters are generated based on a similarity measurement among at least a portion of the plurality of feature vectors;
identify, based on the one or more event clusters, at least one of an AV discrepancy and a map discrepancy that is associated with the portion of the plurality of AV takeover events; and
direct the fleet of AVs to navigate a real-world environment based on at least one of the AV discrepancy and the map discrepancy.

16. The non-transitory computer-readable storage medium of claim 15, comprising further instructions, wherein to process the user feedback to generate the one or more event clusters the one or more processors are further caused to perform operations comprising:
identify, based on the user feedback, at least two AV takeover events from the plurality of AV takeover events that have similar label data; and
identify, based on the user feedback, at least two AV takeover events from the plurality of AV takeover events that have similar location coordinate data.

17. The non-transitory computer-readable storage medium of claim 15, wherein the map discrepancy corresponds to a mislabeled pre-existing map feature.

18. The non-transitory computer-readable storage medium of claim 15, wherein the map discrepancy corresponds to a feature that is not represented on an AV map.

19. The non-transitory computer-readable storage medium of claim 15, wherein user feedback is received via a social-networking platform.

* * * * *